US012233694B2

(12) United States Patent
Zheng et al.

(10) Patent No.: US 12,233,694 B2
(45) Date of Patent: Feb. 25, 2025

(54) WIND DEFLECTOR ASSEMBLY AND VEHICLE SUNROOF

(71) Applicant: Webasto SE, Stockdorf (DE)

(72) Inventors: MingJun Zheng, Shanghai (CN); Bao Jia Liu, Shanghai (CN); Jun Chen, Shanghai (CN)

(73) Assignee: WEBASTO SE, Stockdorf (DE)

( * ) Notice: Subject to any disclaimer, the term of this patent is extended or adjusted under 35 U.S.C. 154(b) by 273 days.

(21) Appl. No.: 17/940,656

(22) Filed: Sep. 8, 2022

(65) Prior Publication Data

US 2023/0083675 A1 Mar. 16, 2023

(30) Foreign Application Priority Data

Sep. 13, 2021 (CN) .......................... 202122205111.4

(51) Int. Cl.
*B60J 7/22* (2006.01)
*B60J 7/043* (2006.01)
*B62D 35/00* (2006.01)

(52) U.S. Cl.
CPC ................. *B60J 7/22* (2013.01); *B60J 7/043* (2013.01); *B62D 35/00* (2013.01)

(58) Field of Classification Search
CPC .................................... B60J 7/22; B60J 7/223
USPC ........................ 296/217, 180.1, 180.2, 180.4
See application file for complete search history.

(56) References Cited

U.S. PATENT DOCUMENTS 9,873,314 B1 * 1/2018 Grimaldo ................... B60J 7/22
2017/0100995 A1 4/2017 Konishi

FOREIGN PATENT DOCUMENTS

CN           109532437 A  *  3/2019
DE       102017219072 A1     4/2018

OTHER PUBLICATIONS

CN109532437 Text (Year: 2019).*
Office Action issued against corresponding German Application No. 10 2022 123 153.4; mailed Aug. 12, 2024; In German with English Machine Translation (8 pages).

* cited by examiner

*Primary Examiner* — Dennis H Pedder
(74) *Attorney, Agent, or Firm* — Fitch, Even, Tabin & Flannery, LLP

(57) ABSTRACT

A wind deflector assembly mountable to a sunroof frame having a support arm configured to be rotatable at least relative to a transverse direction of the sunroof frame; a torsion spring mounting seat adapted to be secured to the sunroof frame, the torsion spring mounting seat comprising a limiting shaft and a limiting boss adjacent to the limiting shaft; and a torsion spring having a helical portion, and a short torsion arm and a long torsion arm which are respectively arranged at two ends of the helical portion, the helical portion being adapted to be fitted over the limiting shaft, the short torsion arm being adapted to be attached to the limiting boss, the long torsion arm being adapted to be attached to the support arm, and the limiting boss being adapted to limit a displacement of the helical portion in a vertical direction of the sunroof frame.

10 Claims, 3 Drawing Sheets

WIND DEFLECTOR ASSEMBLY AND VEHICLE SUNROOF

CROSS-REFERENCE TO RELATED APPLICATION

This application claims priority from China patent application no. CN 202122205111.4 filed on Sep. 13, 2021, which is hereby incorporated herein by reference in its entirety for all purposes.

TECHNICAL FIELD

The present utility model relates generally to the field of vehicle sunroofs, and more particularly to a wind deflector assembly including a torsion spring and a torsion spring mounting seat, and a vehicle sunroof including the wind deflector assembly.

BACKGROUND ART

Wind deflectors are widely applied to sunroof frames of vehicles. When sunroof glass is opened, the wind deflector bounces up to guide an airflow so as to prevent the airflow from blowing directly to passengers in the vehicle. When the sunroof glass is closed, the wind deflector is pressed under the sunroof glass as the sunroof glass moves.

In the existing designs, there are two types of torsion spring structures commonly used for the wind deflectors, namely a first type of torsion spring 101 as shown in FIG. 1, the torsion spring 101 having a plug-in short torsion arm 1010, and a second type of torsion spring 102 as shown in FIG. 2, the torsion spring 102 having a straight short torsion arm 1020. The two types of torsion spring structures are merely simply attached to a sunroof frame, and during use, the torsion spring is likely to come out from the sunroof frame, resulting in the displacement of the wind deflector, so that the sunroof cannot be smoothly opened or closed. Moreover, to mount the second type of torsion spring 102, it is necessary to provide a through hole in the sunroof frame, increasing the possibility that rain or dust enters the vehicle.

The content described in the Background Art section should not be construed as the prior art due to being mentioned in or associated with the Background Art section.

SUMMARY OF THE UTILITY MODEL

In view of the above-mentioned problems in the prior art, an objective of the present utility model is to provide a wind deflector assembly with a torsion spring mounting seat thereof having a limiting structure, which can solve the problem of a torsion spring coming out. In addition, the wind deflector assembly according to the present utility model operates stably and has low noise.

In order to achieve the above objective, according to a first aspect of the present utility model, a wind deflector assembly is provided, which is adapted to be mounted to a sunroof frame of a vehicle, wherein the wind deflector assembly comprises:
a support arm configured to be rotatable at least relative to a transverse direction of the sunroof frame;
a torsion spring mounting seat adapted to be secured to the sunroof frame, the torsion spring mounting seat comprising a limiting shaft and a limiting boss adjacent to the limiting shaft; and
a torsion spring comprising a helical portion, and a short torsion arm and a long torsion arm which are respectively arranged at two ends of the helical portion, the helical portion being adapted to be fitted over the limiting shaft, the short torsion arm being adapted to be attached to the limiting boss, the long torsion arm being adapted to be attached to the support arm, and the limiting boss being adapted to limit a displacement of the helical portion in a vertical direction of the sunroof frame.

According to the above technical concept, the present utility model may further comprise any one or more of the following optional forms.

In some optional forms, the end of the short torsion arm away from the helical portion is provided with a first bent portion which is adapted to be attached to a first end of the limiting boss away from the limiting shaft, and a second end of the limiting boss close to the limiting shaft is provided with a stop portion so as to limit the helical portion of the torsion spring.

In some optional forms, the stop portion comprises an arc-shaped recess facing the limiting shaft and formed on the second end of the limiting boss, and at least part of the helical portion of the torsion spring is received between the arc-shaped recess and the limiting shaft.

In some optional forms, the stop portion further comprises a flange extending along the arc-shaped recess and located above the limiting shaft, the flange extending in the transverse direction of the sunroof frame to at least partially cover a length of the helical portion of the torsion spring.

In some optional forms, the flange is provided with a reinforcing rib extending towards the first end of the limiting boss.

In some optional forms, the limiting boss is further provided with an abutment platform which forms an avoidance opening between the flange and the sunroof frame, and the long torsion arm of the torsion spring is adapted to be attached to the support arm through the avoidance opening.

In some optional forms, the long torsion arm of the torsion spring is provided with a second bent portion at a position adjacent to the avoidance opening, the second bent portion being bent towards the short torsion arm.

In some optional forms, the torsion spring mounting seat further comprises a positioning boss spaced apart from the limiting boss, and a positioning groove extending at least in a longitudinal direction of the sunroof frame is formed between the limiting boss and the positioning boss, the positioning groove being adapted to receive the short torsion arm of the torsion spring.

In some optional forms, the limiting boss is further provided with an inclined surface which has a decreasing height in a direction away from the limiting shaft, and the long torsion arm of the torsion spring is adapted to abut against the inclined surface.

According to a second aspect of the present utility model, a vehicle sunroof is provided, comprising a sunroof frame and the wind deflector assembly according to the first aspect of the present utility model.

In some optional forms, the torsion spring mounting seat of the wind deflector assembly is integrally formed on the sunroof frame.

In some optional forms, the sunroof frame is provided with a positioning surface which forms an arc-shaped concave surface facing the limiting shaft of the torsion spring mounting seat, and the positioning surface and the limiting boss are respectively located on different sides of the limiting shaft to position the helical portion of the torsion spring.

The wind deflector assembly and the vehicle sunroof comprising the wind deflector assembly of the present utility model have the following beneficial effects: a limiting structure is provided in the vertical direction of the sunroof frame by means of the torsion spring and the torsion spring mounting seat mutually cooperating with each other, preventing the torsion spring from coming out of the torsion spring mounting seat, thereby providing a wind deflector assembly stable in operation.

The above advantages and other advantages and features will become apparent from the following detailed descriptions of preferred embodiments with reference to the accompanying drawings.

BRIEF DESCRIPTION OF THE DRAWINGS

Other features and advantages of the present utility model will be better understood through the following optional embodiments described in detail with reference to the accompanying drawings. The same or similar parts are identified by the same reference numerals in the accompanying drawings, in which.

DETAILED DESCRIPTION OF EMBODIMENTS

As will be understood by those of ordinary skill in the art, various features of the embodiments shown and described with reference to anyone of the drawings could be combined with the features shown in one or more other drawings to produce other embodiments that are not explicitly shown or described. The combinations of features shown provide representative embodiments for typical applications. However, various combinations and modifications of the features are desirable in accordance with the teachings of the present disclosure for specific applications or implementations.

In the present utility model, three directions of X, Y and Z perpendicular to one another are shown in the figures, wherein the X direction and an opposite direction thereof are defined as a longitudinal direction of a sunroof frame of a vehicle, the Y direction and an opposite direction thereof are defined as a transverse direction of the sunroof frame of the vehicle, and the Z direction and an opposite direction thereof are defined as a vertical direction of the sunroof frame of the vehicle.

Figure 1:
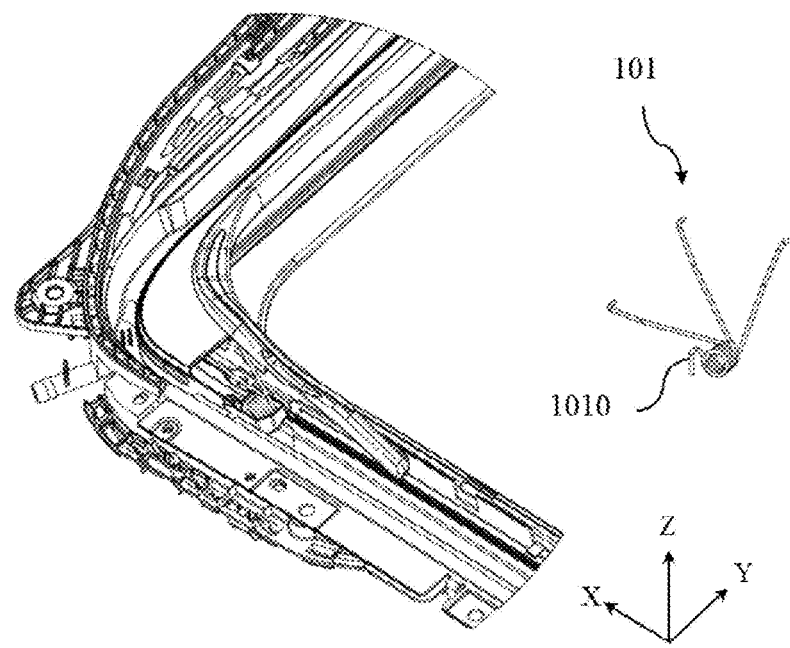
FIG. 1 shows a schematic diagram of a first type of torsion spring for a wind deflector assembly in the prior art and the mounting thereof.
Figure 2:
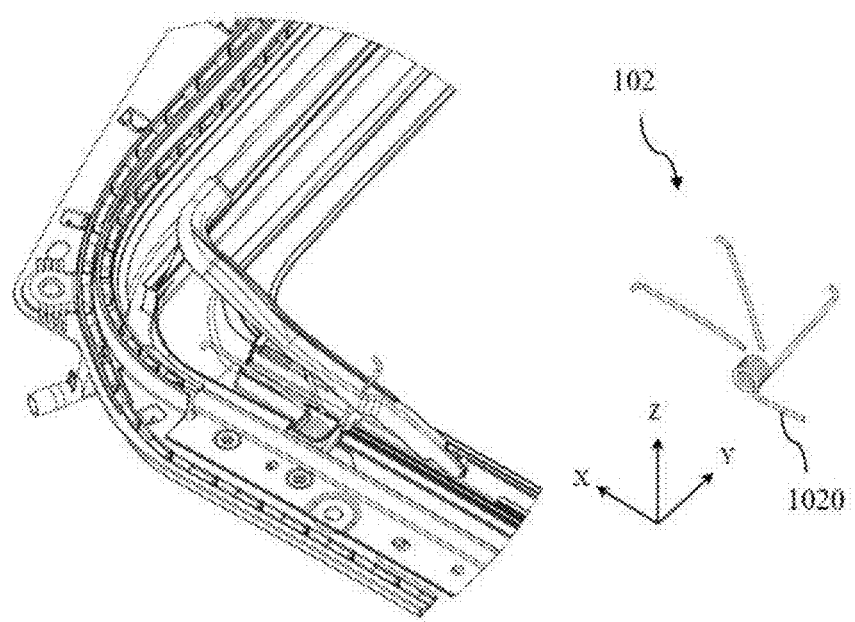
FIG. 2 shows a schematic diagram of a second type of torsion spring for a wind deflector assembly in the prior art and the mounting thereof.
Figure 3:
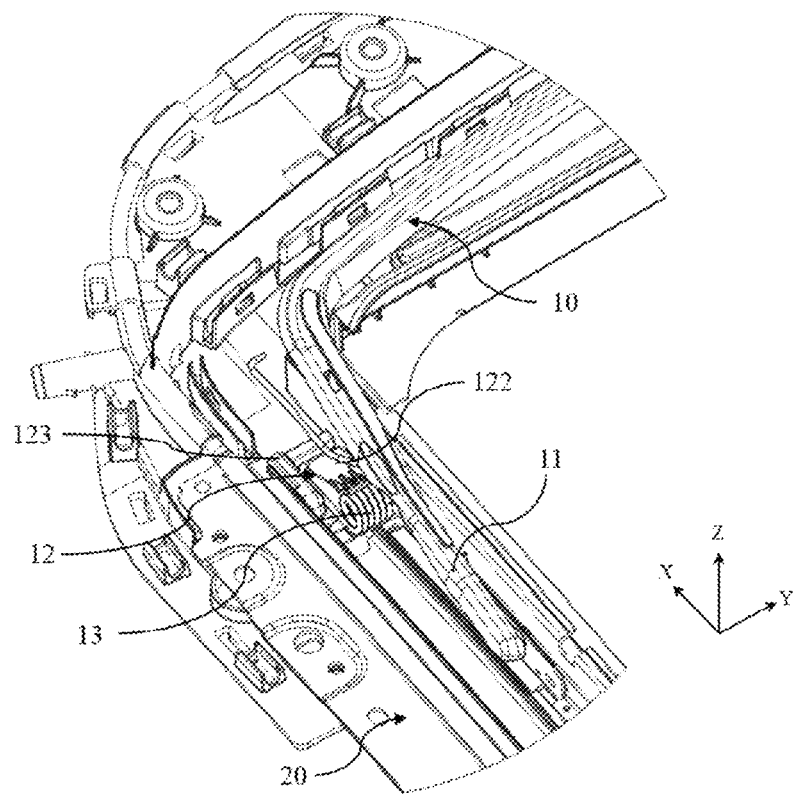
FIG. 3 shows a schematic perspective view of a wind deflector assembly according to an embodiment of the present application, with the wind deflector assembly having a torsion spring in a mounted state.

As shown in FIG. 3, a wind deflector assembly 10 is adapted to be mounted to a sunroof frame 20 of a vehicle. The wind deflector assembly 10 comprises a support arm 11, a torsion spring mounting seat 12 and a torsion spring 13. The support arm 11 is configured to be rotatable at least relative to a transverse direction (the direction indicated by the arrow Y and an opposite direction thereof) of the sunroof frame 20. Further, one end of the support arm 11 is preferably hingedly connected to a sliding member, which is translatable in a longitudinal direction (the direction indicated by the arrow X and an opposite direction thereof) of the sunroof frame 20, to achieve rotation of the support arm 11 in the transverse direction and translation thereof in the longitudinal direction relative to the sunroof frame 20, thereby better receiving the wind deflector assembly 10 within the sunroof frame 20.

Figure 4:
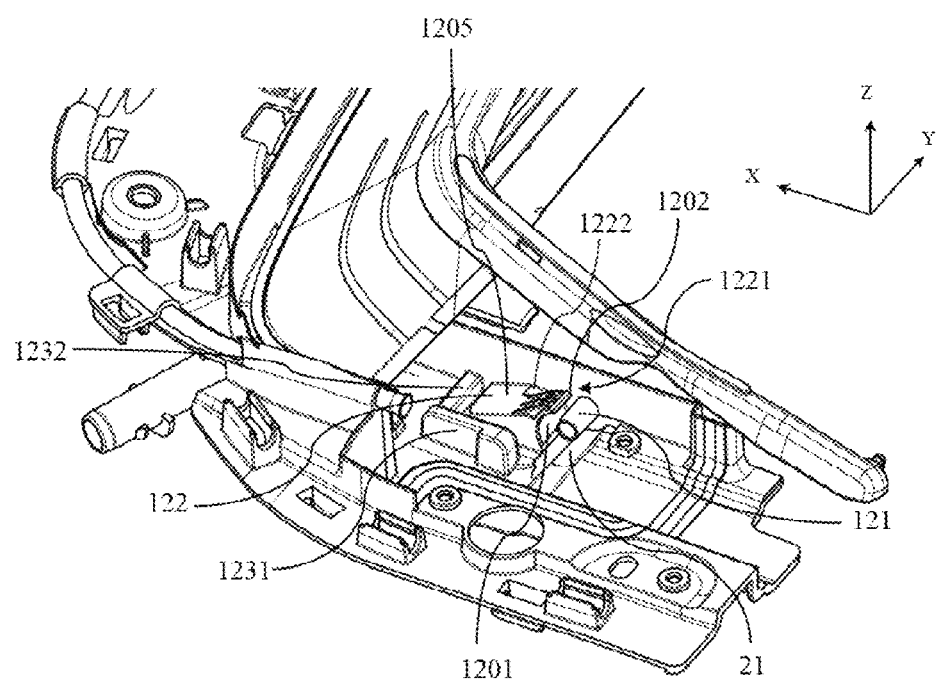
FIG. 4 shows a schematic perspective view of a wind deflector assembly according to an embodiment of the present application, with the torsion spring of the wind deflector assembly being not mounted.
Figure 5:
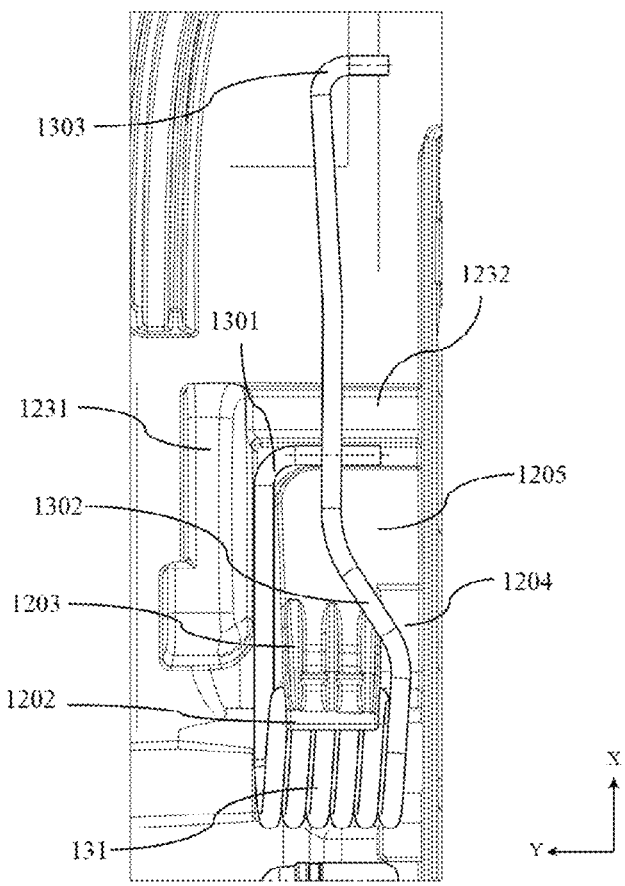
FIG. 5 shows a schematic top view of a torsion spring of a wind deflector assembly according to an embodiment of the present application in a mounted state.
Figure 6:
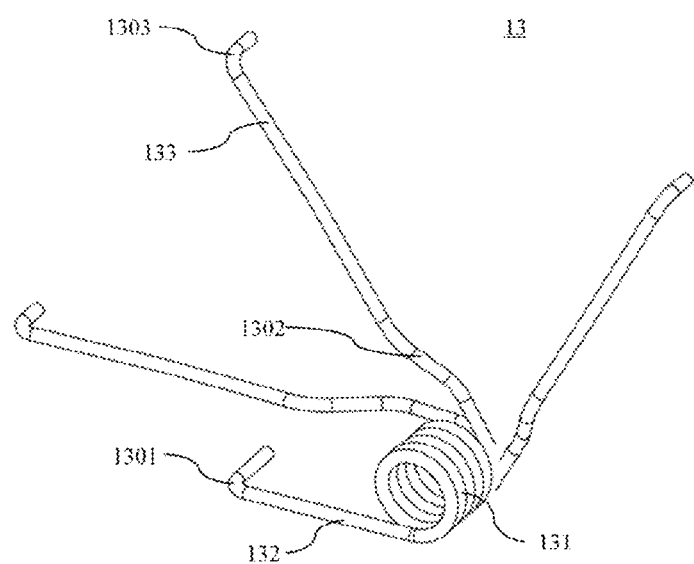
FIG. 6 shows a schematic perspective view of a torsion spring according to an embodiment of the present application.

The torsion spring mounting seat 12 is adapted to be secured to the sunroof frame 20. As shown in FIG. 4, the torsion spring mounting seat 12 comprises a limiting shaft 121 and a limiting boss 122 adjacent to the limiting shaft 121. With reference to FIG. 6, the torsion spring 13 comprises a helical portion 131, and a short torsion arm 132 and a long torsion arm 133 which are respectively disposed at two ends of the helical portion 131. FIG. 6 shows three variable states of the long torsion arm 133. With reference to FIG. 5, the helical portion 131 of the torsion spring 13 in amounted state as shown in FIG. 3 is fitted over the limiting shaft 121, the short torsion arm 132 is adapted to be attached to the limiting boss 122, the long torsion arm 133 is adapted to be attached to the support arm 11, and the limiting boss 122 is adapted to limit the displacement of the helical portion 131 in the vertical direction (the direction indicated by the arrow Z and an opposite direction thereof) of the sunroof frame 20. With the above-mentioned arrangement, the torsion spring 13 provides an elastic force between the sunroof frame 20 and the support arm 11. When sunroof glass is opened, the support arm 11 bounces up under the elastic force of the torsion spring 13, the support arm 11 drives, for example, a wind deflector web, to form a windward surface so as to prevent an airflow from being directly blown to passengers in the vehicle. When the sunroof glass is closed, the sunroof glass exerts a pressure on the support arm 11, and this pressure overcomes the elastic force of the torsion spring 13 so that the support arm 11 is received in the sunroof frame and is pressed under the sunroof glass.

Specifically, with reference to FIGS. 5 and 6, the short torsion arm 132 of the torsion spring 13 has a first bent portion 1301 at the end away from the helical portion 131. The first bent portion 1301 is adapted to be attached to a first end of the limiting boss 122 away from the limiting shaft 121, and a second end of the limiting boss 122 close to the limiting shaft 121 is provided with a stop portion 1221. The stop portion 1221 is arranged adjacent to the limiting shaft 121, and the stop portion 1221 has a limiting effect on the helical portion 131 when the helical portion 131 of the torsion spring 13 is fitted over the limiting shaft 121. More specifically, as shown in FIG. 4, the stop portion 1221 comprises an arc-shaped recess 1201 facing the limiting shaft 121 and formed on the second end of the limiting boss 122, and at least part of the helical portion 131 of the torsion spring 13 is received between the arc-shaped recess 1201 and the limiting shaft 121. With reference to the schematic top view shown in FIG. 5, the stop portion 1221 further comprises a flange 1202 extending along the arc-shaped recess 1201 and located above the limiting shaft 121. The flange 1202 extends in the transverse direction of the sunroof frame to at least partially cover a length of the helical portion 131 of the torsion spring 13. It should be noted that the orientation term "above" includes both an orientation directly above and an orientation obliquely above. It can be seen therefrom that the stop portion 1221 at least partially covers the helical portion 131 in the vertical direction of the sunroof frame 20, and the helical portion 131 does not come out in the vertical direction of the sunroof frame 20 under the combined action of the limiting shaft 121 and the stop portion 1221.

In an optional embodiment, in order to ensure the service life of the stop portion 1221, the flange 1202 of the stop portion 1221 is provided with a reinforcing rib 1203 extending towards the first end of the limiting boss 122.

Further optionally, with reference to FIGS. 4 and 5, the limiting boss 122 is further provided with an abutment platform 1222. The abutment platform 1222 forms an avoidance opening 1204 between the flange 1202 and the sunroof frame 20, and the long torsion arm 133 of the torsion spring 13 is adapted to be attached to the support arm 11 through the avoidance opening 1204. The avoidance opening 1204 provides a space for a rotational movement of the long torsion arm 133 as the long torsion arm 133 bounces up or is pressed and the avoidance opening 1204 facilitates the positioning of the long torsion arm 133.

Further optionally, with reference to FIG. 6, the long torsion arm 133 of the torsion spring 13 is provided with a second bent portion 1302 at a position adjacent to the avoidance opening 1204. The second bent portion 1302 is bent towards the short torsion arm 132. Not only interference of the long torsion arm 133 with an edge of the sunroof frame 20 is avoided, but also the long torsion arm 133 having the second bent portion 1302 has a better strength in a length direction thereof. As shown in FIGS. 5 and 6, the end of the long torsion arm 133 away from the helical portion 131 is further provided with a third bent portion 1303. The third bent portion 1303 is hooked through a hole in the support arm 11 so as to attach the long torsion arm 133 to the support arm 11 of the wind deflector assembly 10.

When the long torsion arm 133 of the torsion spring 13 rotates with the rotation of the support arm 11, the first bent portion 1301 of the short torsion arm 132 is limited in the longitudinal direction of the sunroof frame 20 by acting on the first end of the limiting boss 122 away from the limiting shaft 121. Further, the torsion spring mounting seat 12 further comprises a positioning boss 123 spaced apart from the limiting boss 122, and a positioning groove extending at least in the longitudinal direction of the sunroof frame 20 is formed between the limiting boss 122 and the positioning boss 123. The positioning groove is adapted to receive the short torsion arm 132 of the torsion spring 13. In the preferred embodiment shown in FIGS. 3 to 5, the positioning boss 123 comprises a longitudinal positioning boss 1231 and a transverse positioning boss 1232. The longitudinal positioning boss 1231 and the transverse positioning boss 1232 respectively form a longitudinal positioning groove and a transverse positioning groove with the limiting boss 122. It can be seen that the longitudinal positioning groove and the transverse positioning groove jointly form an L-shaped positioning groove adapted to the short torsion arm 132 having the first bent portion 1301, and the portion of the L-shaped positioning groove that extends in the longitudinal direction of the sunroof frame 20 limits the displacement of the short torsion arm 132 in the transverse direction of the sunroof frame 20. It should be understood that the short torsion arm 132 of the torsion spring 13 may not be provided with a first bent portion 1301 because the entire torsion spring 13 is already limited in the longitudinal direction of the sunroof frame when the helical portion 131 is rotatably fitted over the limiting shaft 121, and the helical portion 131 of the torsion spring has only a very small movement gap in the longitudinal direction of the sunroof frame. Preferably, the movement gap of the helical portion 131 in the longitudinal direction of the sunroof frame 20 is further reduced by providing the first bent portion 1301 at the end of the short torsion arm 132 away from the helical portion 131 and engaging the first bent portion 1301 with the first end of the limiting boss 122 away from the limiting shaft 121. Based on the first bent portion 1301, a transverse positioning boss 1232 is provided to form a transverse positioning groove, thereby positioning the first bent portion 1301 of the short torsion arm 132.

It can be seen that the limiting boss 122 is configured to protrude from the sunroof frame 20 and has a certain height. Preferably, the limiting boss 122 and the positioning boss 123 of the torsion spring mounting seat 12 are integrally formed on the sunroof frame 20.

In an optional embodiment, with reference to FIGS. 4 and 5, the limiting boss 122 is further provided with an inclined surface 1205. The inclined surface 1205 has a decreasing height in a direction away from the limiting shaft 121, and when the wind deflector assembly 10 is closed, the long torsion arm 133 of the torsion spring 13 is adapted to abut downwardly against the inclined surface 1205 so as to further receive the wind deflector assembly 10 within the sunroof frame 10. It should be understood that the abutment platform 1222 is formed as a horizontal plane extending in the longitudinal direction of the sunroof frame 20, and the inclined surface 1205 is inclined from the abutment platform 1222.

The present utility model provides the wind deflector assembly 10 according to the above-mentioned embodiment, and also a vehicle sunroof comprising a sunroof frame 20 and the wind deflector assembly 10 according to the above-mentioned embodiment. The sunroof frame 20 is further provided with a positioning surface 21. The positioning surface 21 forms an arc-shaped concave surface facing the limiting shaft 121 of the torsion spring mounting seat 12, and the positioning surface 21 and the limiting boss 122 are respectively located on different sides of the limiting shaft 121, so as to position the helical portion 131 of the torsion spring 13. In other words, the arc-shaped recess 1201 of the limiting boss 122 and the positioning surface 21 are respectively located on different arc segments centered on the limiting shaft 121, so as to further position the helical portion 131 of the torsion spring 13.

According to the concept disclosed by the present utility model, the mutually cooperating torsion spring mounting seat 12 and torsion spring 13 of the wind deflector assembly 10 achieves limiting in the transverse direction, the longitudinal direction and the vertical direction of the sunroof frame 20, the problem of the torsion spring coming out is solved, and a wind deflector assembly 10 stable in operation and low in operation noise is provided.

It should be understood that the embodiments shown in FIGS. 1 to 6 merely illustrate alternative shapes, sizes and arrangements of various optional components, but are merely schematic rather than restrictive, and that other shapes, sizes and arrangements may be adopted without departing from the spirit and scope of the present utility model.

The technical contents and technical features of the present utility model have been disclosed above; however, it can be understood that a person skilled in the art would have been able to make various changes and modifications to the disclosed concept under the inventive idea of the present utility model, which shall fall within the scope of protection of the present utility model. The description of the above embodiments is intended to be illustrative and not restrictive, and the scope of protection of the present utility model is defined by the appended claims.

The invention claimed is:

1. A wind deflector assembly adapted to be mounted to a sunroof frame of a vehicle, wherein the wind deflector assembly comprises:
a support arm configured to be rotatable at least relative to a transverse direction of the sunroof frame; a torsion spring mounting seat adapted to be secured to the sunroof frame, the torsion spring mounting seat comprising a limiting shaft and a limiting boss adjacent to the limiting shaft; and
a torsion spring comprising a helical portion, and a short torsion arm and a long torsion arm which are respectively arranged at two ends of the helical portion, the helical portion being adapted to be fitted over the limiting shaft,
the short torsion arm being adapted to be attached to the limiting boss to limit a displacement of the helical portion in a vertical direction of the sunroof frame by means of the limiting boss, and
the long torsion arm being adapted to be attached to the support arm,
wherein the end of the short torsion arm away from the helical portion is provided with a first bent portion which is adapted to be attached to a first end of the limiting boss away from the limiting shaft, and a second end of the limiting boss close to the limiting shaft is provided with a stop portion so as to limit the helical portion of the torsion spring.

2. The wind deflector assembly according to claim 1, wherein the stop portion comprises an arc-shaped recess facing the limiting shaft and formed on the second end of the limiting boss, and at least part of the helical portion of the torsion spring is received between the arc-shaped recess and the limiting shaft.

3. The wind deflector assembly according to claim 2, wherein the stop portion further comprises a flange extending along the arc-shaped recess and located above the limiting shaft, the flange extending in the transverse direction of the sunroof frame to at least partially cover a length of the helical portion of the torsion spring.

4. The wind deflector assembly according to claim 3, wherein the flange is provided with a reinforcing rib extending towards the first end of the limiting boss.

5. The wind deflector assembly according to claim 4, wherein the limiting boss is further provided with an abutment platform which forms an avoidance opening between the flange and the sunroof frame, and the long torsion arm of the torsion spring is adapted to be attached to the support arm through the avoidance opening.

6. The wind deflector assembly according to claim 5, wherein the long torsion arm of the torsion spring is provided with a second bent portion at a position adjacent to the avoidance opening, the second bent portion being bent towards the short torsion arm.

7. A wind deflector assembly adapted to be mounted to a sunroof frame of a vehicle, wherein the wind deflector assembly comprises:
a support arm configured to be rotatable at least relative to a transverse direction of the sunroof frame; a torsion spring mounting seat adapted to be secured to the sunroof frame, the torsion spring mounting seat comprising a limiting shaft and a limiting boss adjacent to the limiting shaft; and
a torsion spring comprising a helical portion, and a short torsion arm and a long torsion arm which are respectively arranged at two ends of the helical portion, the helical portion being adapted to be fitted over the limiting shaft,
the short torsion arm being adapted to be attached to the limiting boss to limit a displacement of the helical portion in a vertical direction of the sunroof frame by means of the limiting boss, and
the long torsion arm being adapted to be attached to the support arm,
wherein the torsion spring mounting seat further comprises a positioning boss spaced apart from the limiting boss, and a positioning groove extending at least in a longitudinal direction of the sunroof frame is formed between the limiting boss and the positioning boss, the positioning groove being adapted to receive the short torsion arm of the torsion spring.

8. The wind deflector assembly according to claim 7, wherein the limiting boss is further provided with an inclined surface which has a decreasing height in a direction away from the limiting shaft, and the long torsion arm of the torsion spring is adapted to abut against the inclined surface.

9. A vehicle sunroof, comprising a sunroof frame and a wind deflector assembly,
the wind deflector assembly adapted to be mounted to the sunroof frame,
wherein the wind deflector assembly comprises:
a support arm configured to be rotatable at least relative to a transverse direction of the sunroof frame; a torsion spring mounting seat adapted to be secured to the sunroof frame, the torsion spring mounting seat comprising a limiting shaft and a limiting boss adjacent to the limiting shaft; and
a torsion spring comprising a helical portion, and a short torsion arm and a long torsion arm which are respectively arranged at two ends of the helical portion, the helical portion being adapted to be fitted over the limiting shaft,
the short torsion arm being adapted to be attached to the limiting boss to limit a displacement of the helical portion in a vertical direction of the sunroof frame by means of the limiting boss,
the long torsion arm being adapted to be attached to the support arm, and
wherein the torsion spring mounting seat of the wind deflector assembly is integrally formed on the sunroof frame.

10. The vehicle sunroof according to claim 9, wherein the sunroof frame is provided with a positioning surface which forms an arc-shaped concave surface facing the limiting shaft of the torsion spring mounting seat, and the positioning surface and the limiting boss are respectively located on different sides of the limiting shaft to position the helical portion of the torsion spring.

* * * * *